United States Patent [19]
Sherman

[11] 3,985,233
[45] Oct. 12, 1976

[54] VIBRATORY SEEDLING CLEANER

[75] Inventor: Charles A. Sherman, Tacoma, Wash.

[73] Assignee: Weyerhaeuser Company, Tacoma, Wash.

[22] Filed: Dec. 11, 1975

[21] Appl. No.: 639,949

[52] U.S. Cl. .............................. 209/104; 209/106; 209/271
[51] Int. Cl.² ........................................... B07B 1/15
[58] Field of Search ........... 209/106, 107, 104, 271, 209/350, 324, 351

[56] References Cited
UNITED STATES PATENTS

| | | |
|---|---|---|
| 622,035 | 3/1899 | Bray.............................. 209/106 X |
| 1,014,493 | 1/1912 | Lauritzen et al.................... 209/350 |
| 2,976,550 | 3/1961 | Silver et al...................... 209/106 X |
| 3,265,206 | 8/1966 | Allen ............................. 209/107 X |

Primary Examiner—Allen N. Knowles

[57] ABSTRACT

A seedling cleaning system has an infeed end and an outfeed end with an agitating conveying surface therebetween in order to shake and remove the soil from seedlings while continuously conveying them. A plurality of agitating cams are laterally spaced along a plurality of longitudinally spaced rotatable shafts. An overhead water spray may be provided towards the outfeed end for further cleaning.

9 Claims, 5 Drawing Figures

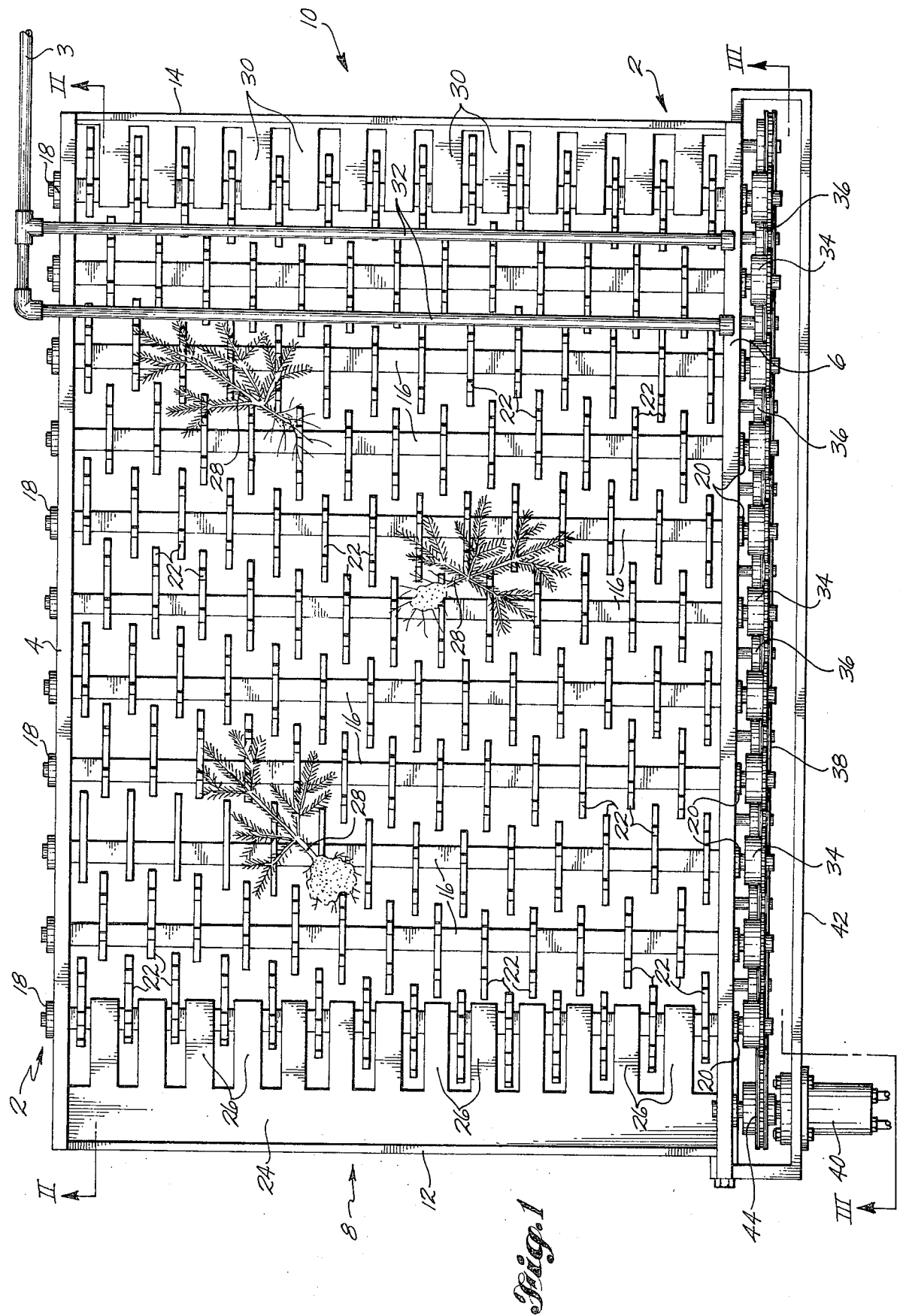

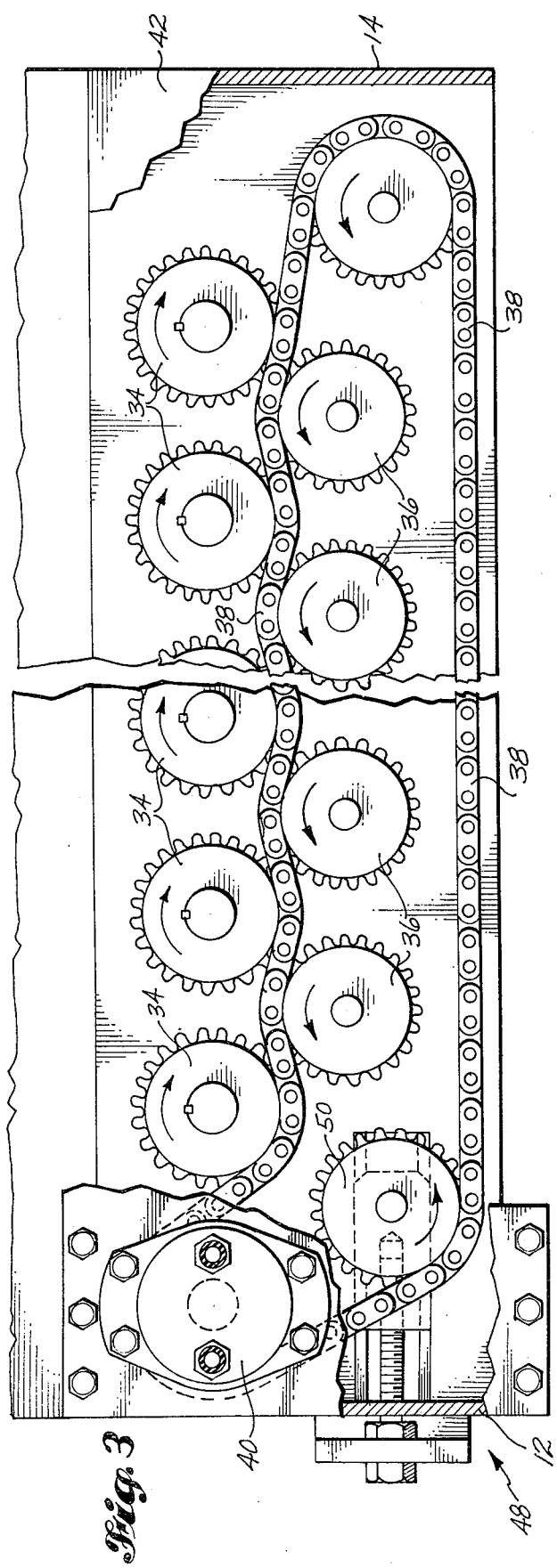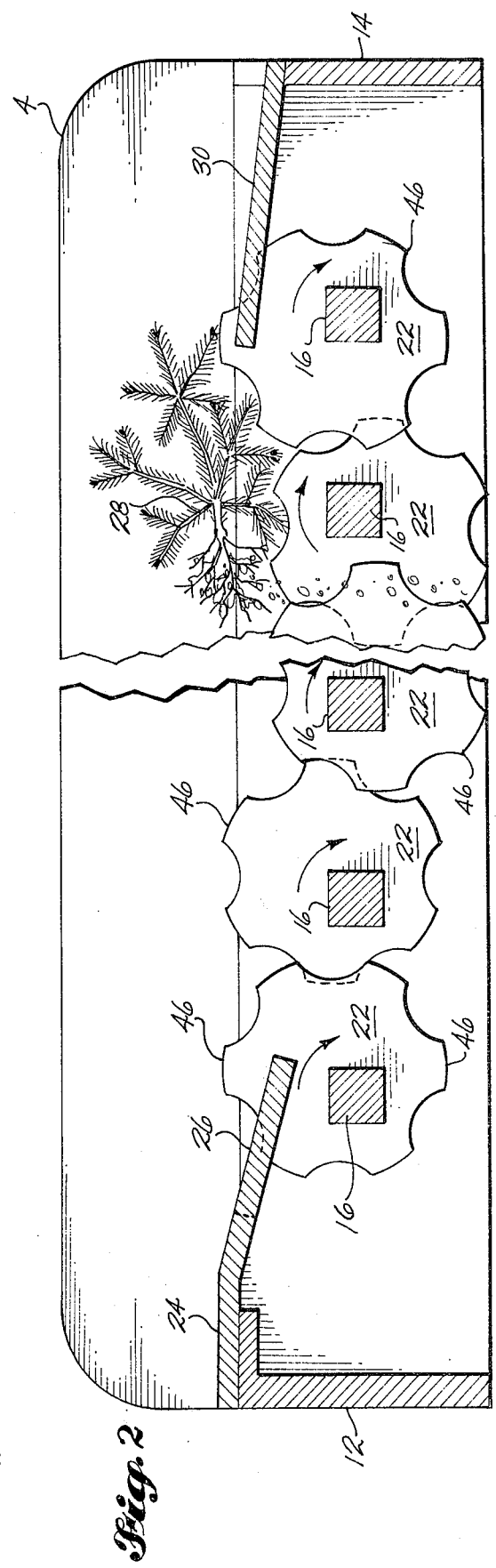

VIBRATORY SEEDLING CLEANER

BACKGROUND OF THE INVENTION

This invention relates generally to the cleaning of tree seedlings after they have been extracted from the ground subsequent to nursery growth. More particularly it relates to an apparatus for vibrating and simultaneously conveying seedlings of the relatively large type in order to remove a substantial amount of accompanying soil from the root structure.

As timber is being commercially harvested from various lands, it is common practice to replant within a reasonable period of time with young seedlings. For example, in the Douglas fir growing region of the United States generally located in the Pacific Northwest, as a section of land is harvested it will then be prepared for replanting usually within a one year period with Douglas fir seedlings, preferrably of a superior genetic stock. This practice, of course, insures the sustained yield of Douglas fir timber and the resulting usable wood fiber. Similar harvesting and replanting techniques are utilized in other sections of the country as well as overseas.

While forest lands may be regenerated by using seed stock, it is the common practice and the practice with the highest economic benefits, to utilize one to two year old seedlings for replanting. In this sense a seedling is a young tree that has an existing root structure and growing stem with branches. These young seedlings are usually grown in nursery environments where they can be cultivated in a controlled environment, assuring not only a high survival rate but also a high quality.

Many of the commercial timber growing companies utilize this process for regenerating their forest lands and, as one would expect, it then becomes desirable to develop a more efficient seedling growing, collection, cleaning, and in general, processing capability to enhance the overhall regeneration effort. In most of the existing processes for growing young seedlings, when they are ready to be collected, a machine capable of lifting the seedlings from their seed beds is employed. An example of such a harvesting apparatus may be seen by referring to U.S. Pat. No. 3,693,721 wherein a mechanized harvesting apparatus is disclosed. Usually the next step in the overall process is to clean the lifted seedlings by attempting to remove the attached soil remaining after the lifting process.

One of the basic problems with this part of the process is that the soil must be removed with minimum harm to the delicate root structure and small stem and branches. Gentle handling is a primary criteria in the entire seedling collection and processing function, and in past practice an undue amount of damage was usually incurred in merely handling the seedlings from lifting to packing. Even with careful manual cleaning of the root system a large amount of damage occurred. Of course the other adverse feature of manual handling is its cost and low rate of productivity.

It therefore becomes necessary to seriously consider the cleaning step in the seedling collection and preparation process in order to make it more efficient. Of course there are several obvious design and performance criteria that arise from the above discussion, among them being minimum damage to the young seedlings, productivity of the cleaning system, efficiency of the soil removal, and overall cost of the system.

Accordingly from the foregoing, one object of the present invention is to provide a seedling cleaning system that is essentially mechanized.

Another object of the present invention is to provide a seedling cleaning system that effectively removes attached soil from the root structures with minimum damage thereto.

Yet a further object is to provide a seedling cleaning system that is of simple construction and low cost.

Yet another object of the present invention is to provide a seedling cleaning system that offers a high rate of seedlings cleaned per unit of time.

These and other objects of the invention will become apparent upon reading the following specification in conjunction with the attached drawing.

SUMMARY OF THE INVENTION

Briefly this invention is practiced in one form by a seedling cleaning system comprised of a generally longitudinally extending rectangular frame with a plurality of laterally extending rotatable shafts mounted therein each having a plurality of laterally spaced sequentially turned eccentrically mounted agitating cams. At the infeed end of the cleaning system seedlings are uniformly placed atop the agitating cams, while at the outfeed end the substantially cleaned seedlings are directed away from the cleaning system. Each of the rotatable shafts is driven from a common drive means interconnected with the shafts and operable to rotate the shafts in a start-stop fashion. The continuous start-stop-start movement of the meshing adjacent agitating cams causes the individual seedlings to be vibrated up and down, while at the same time conveys them forwardly, thereby not only shaking and removing the soil from the root structures, but also conveying them to the outfeed end of the system.

BRIEF DESCRIPTION OF THE DRAWING

FIG. 1 is a top plan view showing the general arrangement of the working elements in the invention.

FIG. 2 is a broken cross-sectional view taken along line II—II of FIG. 2 and shows the infeed and outfeed ends of the cleaning system as well as the eccentric nature of the agitating cams along the length of the system.

FIG. 3 is a broken cross-sectional view taken along line III—III of FIG. 1 and shows the drive means and sprocket arrangement for rotating the plurality of shafts.

DESCRIPTION OF THE PREFERRED EMBODIMENT

Figure 4:
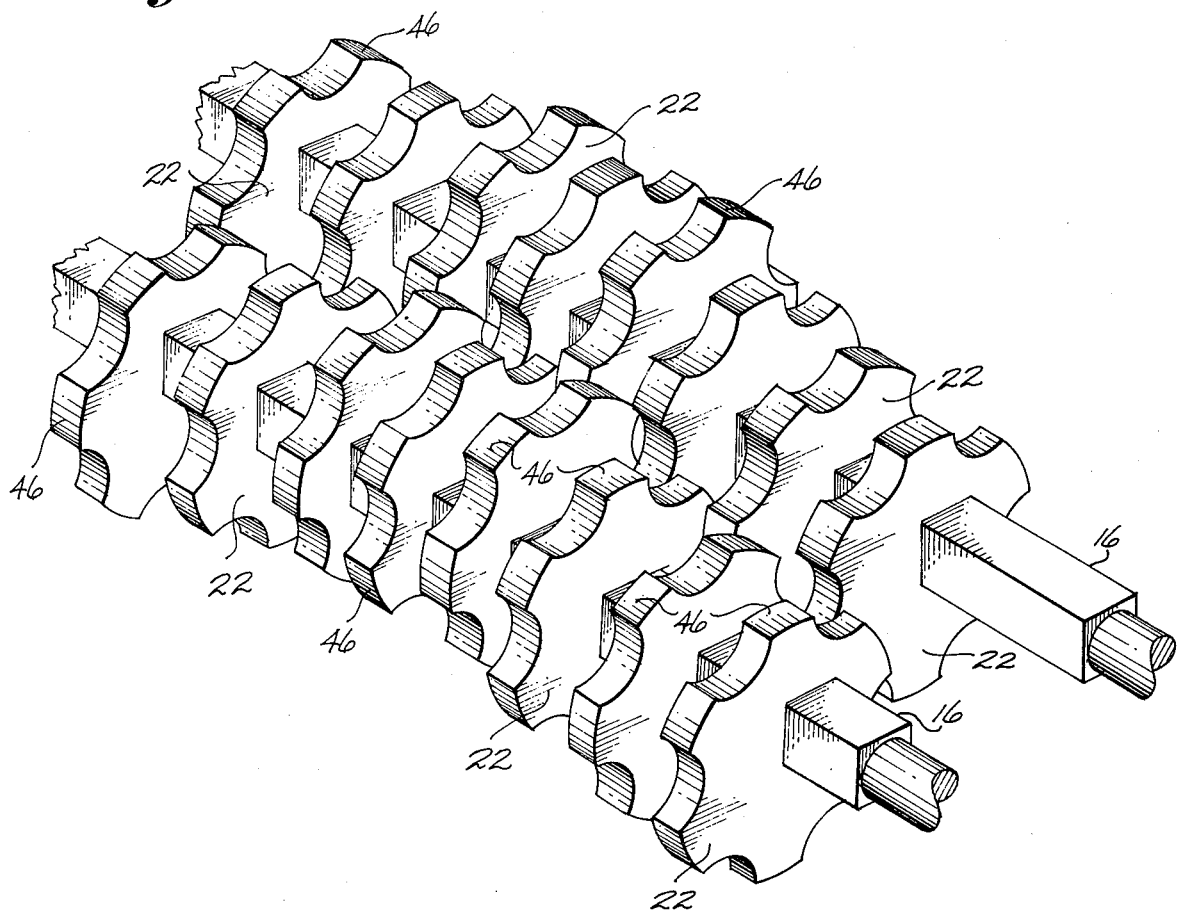
FIG. 4 is a detailed isometric view showing two of the rotatable shafts with their plurality of eccentrically mounted agitating cams.

Looking first at FIG. 1 which depicts the invention in its overall planer configuration, it will be seen that a generally rectangular frame 2 has a pair of opposed side walls 4, 6 that define the lateral dimension of the cleaning apparatus. The cleaning apparatus has an infeed end indicated generally at 8, and an outfeed end which is indicated generally at 10. A pair of end walls 12, 14 extend laterally between the side walls 4, 6 to complete the rectangular frame 2. Since the cleaning apparatus also functions to convey the seedlings in a longitudinal direction from the infeed end to the outfeed end, the side walls 4, 6 are extended upwardly in the vertical direction to a position at least above the horizontal plane formed by the top edges of end walls 12, 14. This of course serves to confine the seedlings within the lateral dimensions of the side walls 4, 6.

Evenly spaced longitudinally from the infeed end 8 to the outfeed end 10 are a plurality of rotatable laterally extending shaft members each indicated as 16. The plurality of shaft members 16 form a horizontal plane that is spaced vertically slightly below the horizontal plane that extends through the infeed end and outfeed end. Each of the shaft members 16 is mounted in a pair of opposed bearing members 18, 20. Evenly spaced along each of the shaft members 16 are a plurality of eccentrically mounted agitating cams each indicated as 22. The detail of the cam mounting and design will be further described later.

Extending longitudinally from the top edge of end wall 12 is the infeed platform 24 which has a plurality of fingers 26 extending between adjacent cams 22 on the first shaft member 16. The fingers 26 are inclined slightly in the downward direction as may be seen by referring to FIG. 2. The infeed platform 24 and fingers 26 are, or course, provided to support incoming seedlings, each of which is indicated as 28, before they are picked up by the first few rows of agitating cams 22. Similarly, at the outfeed end 10 there are positioned along the top edge of end wall 14, a plurality of longitudinally extending outfeed fingers 30. Similarly to fingers 26, the outfeed fingers 28 extend between adjacent cams 22 on the last shaft member 16. Also, as may be seen by referring to FIG. 2, the outfeed fingers 28 are at a slight incline with respect to the horizontal extending downwardly toward the end wall 14.

Positioned overhead of the rectangular frame and plurality of rows of agitating cams 22 is at least one laterally extending water spray line means which serves to direct a light water spray downwardly over the last few rows of agitating cams. The water spray serves to clean the seedlings and to further loosen and remove soil from the root structures as they are being conveyed longitudinally. While in FIG. 1 three water spray lines are depicted each indicated as 32, it has been found that depending on soil conditions, oftentimes a water spray will be unnecessary. Thus, the basic invention does not include as an essential element the water spray means. Of course, water spray lines 32 will connect with a suitable source of water (not shown).

Along the outer face of side wall 4 is positioned the means to drive rotatable shaft members 16. Each rotatable shaft member 16 has a sprocket 34 mounted on its outer end, all being in line. A plurality of idler sprockets 36 are longitudinally spaced along the length of side wall 4 generally adjacent the drive sprockets 34 for maintaining proper tension on the common drive chain 38. Positioned adjacent to the infeed end 8 is the means to drive chain 38 so as to rotate the shaft members 16. In the embodiment shown, the drive means is comprised of a reversable fast acting hydraulic motor 40 which is mounted on side wall 4, and additionally is supported by a secondary longitudinally extending frame member 42. Primary drive sprocket 44 is of course mounted on the shaft of hydraulic motor 40, and serves to motivate the drive chain 38 upon command. The frame member 42 also serves to enclose the overall driving means for shaft members 16, primarily for safety purposes.

Looking now at FIGS. 2 and 3, additional details of the eccentrically mounted agitating cams 22 as well as the drive means for rotating shaft members 16, may be seen. It may be seen that the shaft members 16 are in fact rectangular in cross-section, and the primary reason is for solid mounting of the agitating cams 22. As will be clearly seen, each cam 22 has a plurality of evenly spaced agitator nubs 46 positioned about the circumference of each cam. With the cams depicted in the several figures, each has six nubs around the circumference and are therefore 60° apart. The specified numbers are given for example only and an operable cleaning apparatus could, in fact, employ fewer or more nubs per cam. The nubs, having flat curvilinear surfaces, project radially outward from the maximum circumference of each cam 22.

As will be clearly seen in referring to FIG. 2, each cam is mounted slightly off-center from its center line and this eccentric mounting extends throughout the rows of shaft members 16. In addition to the eccentric mounting, adjacent cams along the same shaft are turned with respect to the prior and subsequent adjacent one in sequence such that the corresponding cams are vertically displaced from one another. The final result of the sequentially turned eccentric mounting and resulting offset between adjacent nubs 46, is that during operation the plane of travel of the individual seedlings 28 is undulating in nature.

In order to maintain the proper amount of tension on drive chain 38, a tension setting means generally indicated at 48, is provided and is positioned substantially adjacent the motor 40. The tension setting means is comprised of a sprocket 50 that is mounted in a longitudinally adjustable frame member 52. Thus whenever it is determined that additional tension is needed in chain 38, the adjustable sprocket 50 will be moved longitudinally toward the end wall 12.

Figure 5:
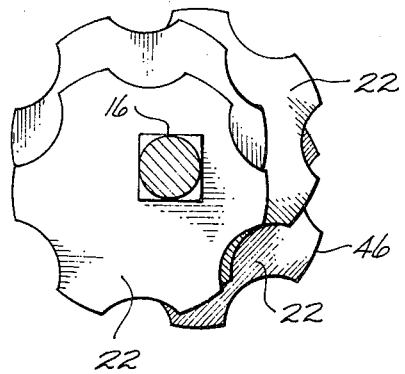
FIG. 5 is a side view looking laterally along one representative shaft showing the eccentric mounting of the cams.

Turning now to FIGS. 4 and 5, additional detail will be given with respect to the spacing relationships between agitating cams. As previously noted, adjacent cams along the same shaft are vertically displaced and angularly offset from one another and in the present embodiment, since they are eccentrically mounted and turned on a rectangular shaft with each having the six nubs, the offset is 30°. Again, the specific angles are to be taken by way of example only and are not intended to limit the scope of the present invention. Agitating cams on an adjacent shaft should be mounted so as to allow each to mesh with the two adjacent cams on an adjacent shaft thereby serving to limit the amount of free space between adjacent rows of cams. A certain amount of free space is, however, necessary in order to allow the root soil to fall through the plurality of undulating agitating cams.

It has been found that for typical seedlings found in the Pacific Northwest such as the Douglas fir seedling, a shaft spacing found workable is on the order of from 4 to 5 inches with the major diameter of a typical agitating cam being on the order of 5½ to 7 inches. A suitable thickness for the agitating cams would be something on the order of from ½ to 1½ inches. As will be recognized by those skilled in the art, the material used to form the agitating cams should be one that has a relatively low coefficient of friction to reduce the abrasive frictional forces between cams and seedlings, particularly at the root structures. Also, it should be noted that the edges of the agitating cams including the nubs, should be reasonably smooth; again, to reduce the friction between the cams and traveling seedlings.

OPERATION OF THE INVENTION

As previously noted, the seedling cleaning system is intended to remove the attached soil with the least amount of damage in an efficient low cost manner. The first step in the process is to activate the motor 40 in order to drive shaft members 16. It was found during experimentation that the motion resulting in the least amount of damage to the seedlings with maximum soil removal was a start-stop-start motion with each start sequence serving to rotate the shafts an approximate quarter turn, with the stop being essentially instantaneous, and then the restart for another quarter turn. This start-stop-start action is continuous and effectively causes the seedlings to vibrate due to the cam and nub arrangement while at the same time moves them forward toward outfeed end 10. As the seedlings are vibrated the soil tends to break up and off of the root structure falling between the agitating cams to a position below the cleaning apparatus. The seedlings are fed into the cleaning system at the infeed end 8 in a continuous, reasonably even manner such that they will be spread out over the agitating cams 22. Any suitable means to feed the seedlings to the cleaning system, such as in inclined conveyor, is within the contemplation of the present invention, as is any suitable means for collecting the cleaned seedlings, such as a takeaway conveyor at the outfeed end 10. As the seedlings move forwardly and reach the outfeed end, if the water spray is utilized, individual droplets of water will serve to further wash finer soil particles away from the seedlings. As previously noted, the water spray is not absolutely necessary to the operability of the present invention although it may serve to enhance the cleaning.

The overall cleaning system can be suitably mounted on an appropriate field vehicle for use at the collection-extraction site in an essentially continuous operation, or it may be utilized at a central collection and processing area where seedlings are brought in from the field in the unclean state.

While a detailed example of the principal embodiment has been described, it is understood that many changes and modifications may be made in the above described seedling cleaning system without departing from the spirit of the invention. All such modifications are intended to be included within the scope of the appended claims.

What is claimed is:

1. A plant cleaning apparatus of the type for removing soil from the root structures of newly extracted young plants such as evergreen seedlings, comprising:
   a frame means having a pair of opposed side walls together with a pair of end walls with one end of the frame means being the infeed end and the other end being the outfeed end,
   a plurality of rotatable shaft members extending laterally between the opposed side walls and substantially evenly spaced in a common plane between the pair of end walls,
   a plurality of agitating cams eccentrically mounted on the shaft members with each cam on the same shaft being turned with respect to the next adjacent cam so its top surface is vertically displaced from the adjacent cams and having cams on adjacent shafts meshing with one another whereby an undulating conveying surface is formed with free spaces defined between adjacent cams for the passage of soil therethrough, and
   means to rotate the shaft members and thereby the agitating cams in a direction that will convey the plants from the infeed end to the outfeed end.

2. The apparatus as in claim 1 further comprising means to spray water generally over the outfeed end in order to further loosen and remove soil.

3. The apparatus as in claim 1 in which the agitating cams have a plurality of evenly spaced nubs about their circumference.

4. The apparatus as in claim 1 wherein adjacent cams along the same shaft member are turned 90° with respect to the next adjacent cam.

5. The apparatus as in claim 1 wherein the shaft members are spaced longitudinally a distance that is on the order of from four to five inches with the major diameter of the agitating cams being on the order of from five and one-half to seven inches.

6. The apparatus as in claim 1 wherein the thickness of the agitating cams is on the order of from one-half to one and one-half inches.

7. The apparatus as in claim 1 wherein the agitating cams are comprised of material having a low coefficient of friction.

8. The apparatus as in claim 1 wherein the edges of the agitating cams are smooth in order to reduce friction between the cams and the plants.

9. The apparatus as in claim 1 wherein the means to rotate the shaft members is comprised of a reversible fast acting hydraulic motor operable to stop and start the rotation of the shaft members with each start sequence serving to rotate the shaft members an approximate quarter turn.

* * * * *